US006925726B2

(12) United States Patent
Roser et al.

(10) Patent No.: US 6,925,726 B2
(45) Date of Patent: Aug. 9, 2005

(54) ALIGNMENT GAUGE FOR CONTINUOUS CASTING MOLD

(75) Inventors: Daniel J. Roser, Oil City, PA (US); Richard C. Stamm, Oil City, PA (US)

(73) Assignee: ESM Manufacturing, Titusville, PA (US)

(*) Notice: Subject to any disclaimer, the term of this patent is extended or adjusted under 35 U.S.C. 154(b) by 0 days.

(21) Appl. No.: 10/934,618

(22) Filed: Sep. 3, 2004

(65) Prior Publication Data

US 2005/0081399 A1 Apr. 21, 2005

Related U.S. Application Data

(60) Provisional application No. 60/499,759, filed on Sep. 3, 2003.

(51) Int. Cl.[7] .............................................. G01D 21/00
(52) U.S. Cl. ............................. 33/645; 33/549; 33/613
(58) Field of Search .................. 33/645, 549, 551–552, 33/555, 613

(56) References Cited

U.S. PATENT DOCUMENTS

| 3,292,216 A | * | 12/1966 | Colombo | 164/435 |
| 4,532,981 A | * | 8/1985 | Hargassner et al. | 164/483 |
| 5,048,195 A | * | 9/1991 | Leonov | 33/645 |

* cited by examiner

*Primary Examiner*—Christopher W. Fulton
*Assistant Examiner*—Tania Courson
(74) *Attorney, Agent, or Firm*—Hodgson Russ LLP

(57) ABSTRACT

An alignment gauge used to align the concave broadface copper in a continuous casting mold with a reference point below the mold such as the first and second rolls in the zero segment. The gauge includes a pair of support members with a first side and a second side. The first side of the support members has a curved edge that matches the concave curved wall of the broadface copper. The first side also has a pair of probes for detecting the position of the first and second rolls in the zero segment. Information regarding the alignment of the concave broadface copper with the first and second rolls in the zero segment is provided to a display in electrical communication with the probe.

23 Claims, 3 Drawing Sheets

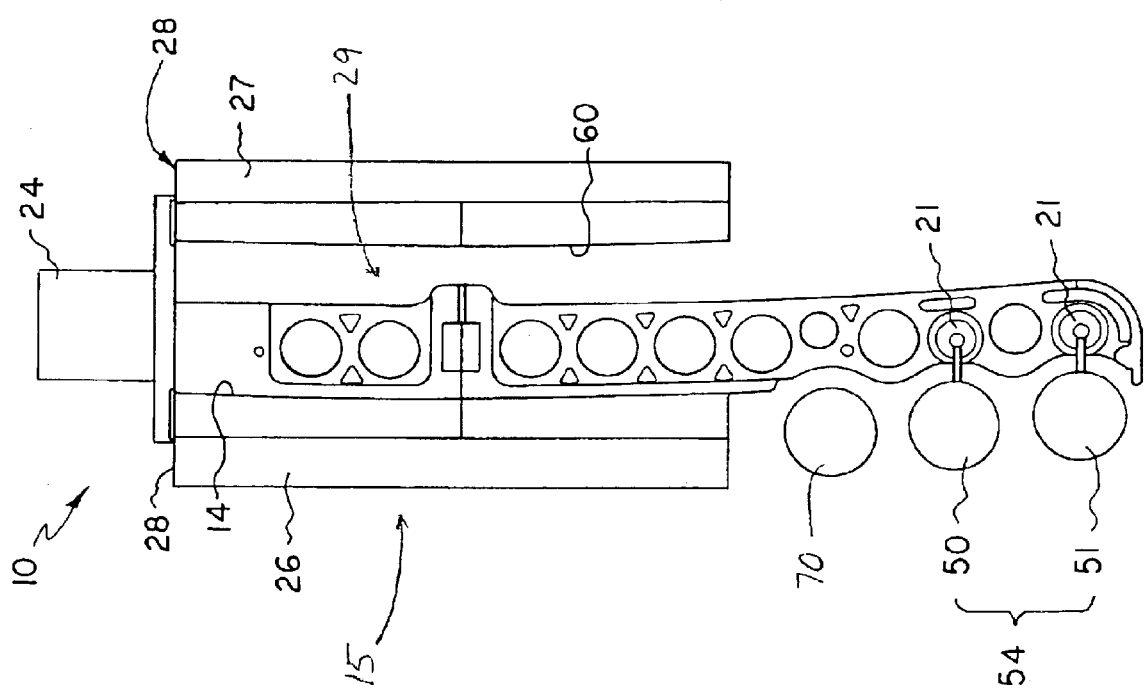

ALIGNMENT GAUGE FOR CONTINUOUS CASTING MOLD

CROSS-REFERENCE TO RELATED APPLICATION

The present application claims priority to U.S. Provisional Patent Application No. 60/499,759 filed on Sep. 3, 2003, and entitled "Alignment Gauge for Continuous Casting Mold," which is hereby incorporated by reference.

FIELD OF INVENTION

The present invention relates to an alignment gauge used to align the concave broadface copper in a continuous casting mold with the first and second rolls in the zero segment.

BRIEF DESCRIPTION OF THE DRAWINGS

The invention is illustrated in the drawings in which like reference characters designate the same or similar parts throughout the figures of which.

DETAILED DESCRIPTION

Figure 1:
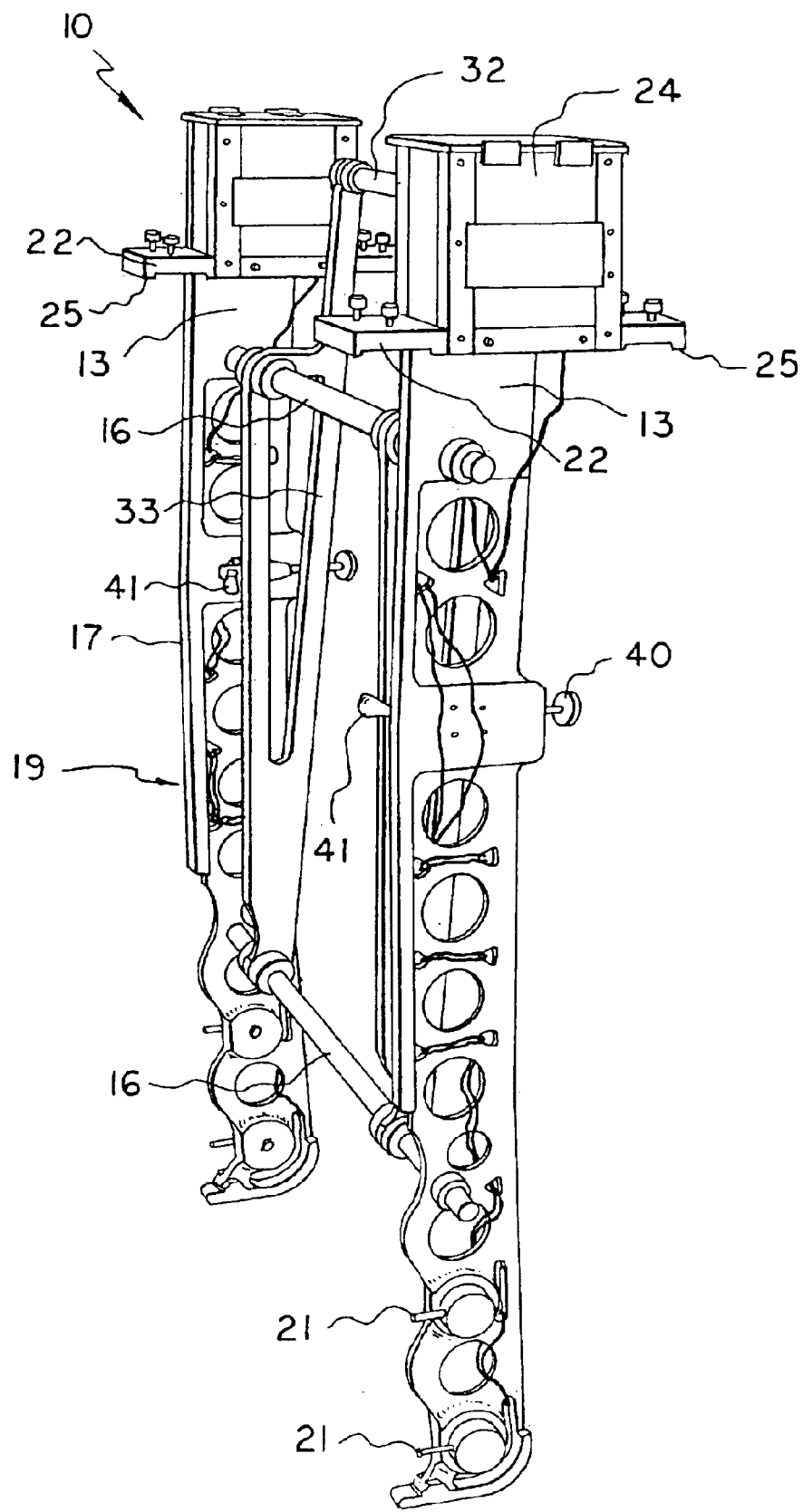
FIG. 1 is a perspective view of the alignment gauge of the present invention.
Figure 2:
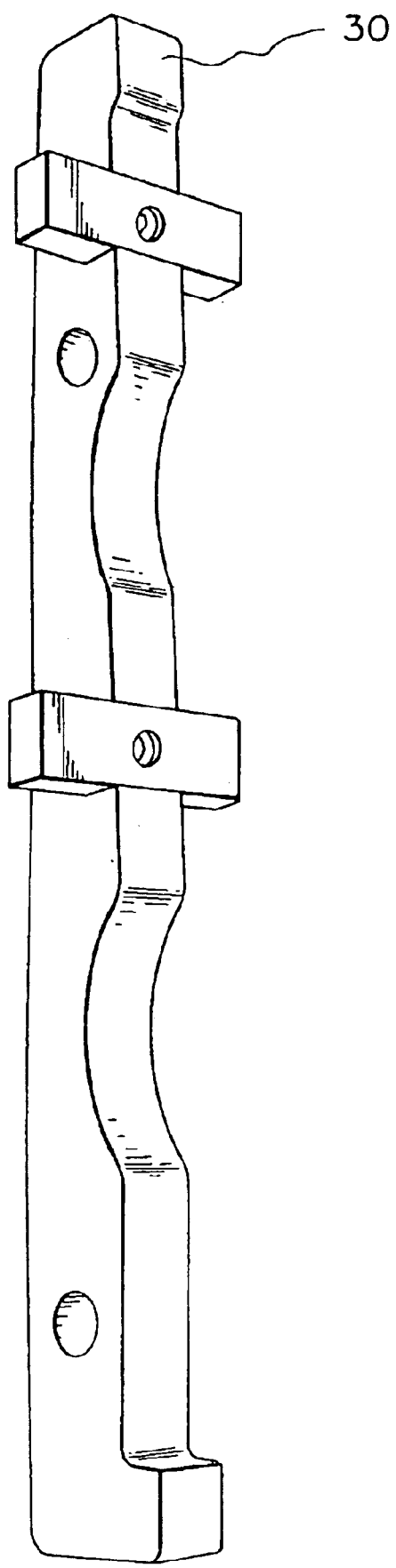
FIG. 2 is a perspective view of a gauge block used for setting the zero position on the probes; and, FIG. 3 is a side view of the alignment gauge of the present invention inserted through a mold cavity into the zero segment.

Referring to FIGS. 1–3, an alignment gauge 10 of the present invention includes a pair of frame members 13 disposed in spaced apart relation by cross members 16. Although the gauge 10 is shown with spaced apart frame members 13, which reduce the weight of the unit, the gauge 10 could be constructed from a single wider frame member as will be evident to those of ordinary skill in the art based on this disclosure. A curved convex edge 17 on a first side 19 of the frame members 13 conforms to the curvature of the concave broadface copper 14 in a continuous casting mold 15. At the top of the gauge 10, a pair of support members 22 extend from the tops of the frame members 13. The support members 22 have arms 25 that rest on the concave and convex broadface waterboxes 26, 27. The machined surface 28 on the top of each water box directly behind the broadface copper is machined in relationship with the neutral axis of the concave copper surface. Accordingly, this machined surface provides a reference point for establishing the position of the gauge 10 so that the curvature of edge 17 of the frame members 13 aligns properly with the curvature of the concave broadface copper.

The curved edge 17 extends along a substantial portion of the length of the frame members 13. At a bottom portion of the frame members 13, the curved edge 17 stops and there are a pair of remote probes 21. The probes 21 are used to detect the contact points of the first and second set of rolls in the zero segment. The probes 21 may also be aligned with other reference points below the mold such as grid sections or zones. For example, the probe 21 could be aligned with the number one zone or the number one grid segment. It will be evident to those of ordinary skill that many types of probes could be used. It has been found that WISDOM series electronic probes from Starrett are suitable for the application. The electronic probes 21 are located at a distance from a display 24. The display 24 is located at the top of the frame for ease of use. The probes 21 are hard wired by cables that extend through the frame members 13. It will be evident to those of ordinary skill in the art that other types of arrangements for remote probes may be utilized. For convenience, the remote display 24 and probe 21 of the present invention are provided with power from a battery (not shown). Other types of power supplies would also be suitable.

A handle 32 is attached to one of the cross members 16 so that the handle 32 is offset from the center of gravity of the gauge 10. An angled extension 33 may be used for attaching the handle 32 to the cross member 16 as shown in FIG. 1. When the gauge 10 is lifted by the handle 32, it rotates counterclockwise with respect to the orientation of FIG. 1. As a result the probes 21 are tilted away from the broadface copper line while the gauge 10 is being inserted into the mold cavity. This tilting prevents the probes 21 from being damaged during insertion.

Turning to FIG. 2, a gauge block 30 is inserted into the bottom of the frame member 13 to set the zero position for the probes 21. The gauge block 30 is curved such that when it is inserted into the frame member 13, the curve of the gauge block 30 aligns with the curved edge 17 of the frame member 13. With the gauge block 30 inserted in this manner, the digital readout for the probes is set to the zero position. The gauge block 30 is then removed from the frame members 13 and the alignment gauge is inserted into the mold cavity until the top support members rest on the waterboxes as described above.

Once the gauge 10 is lowered into a mold cavity 29 (FIG. 3) and the support members are resting on the machined surface on top of the water boxes, the curved surface of the gauge 10 is automatically at the correct height with respect to the mold. The curved edge 17 is positioned against the broadface copper by a spring lock 40 (FIG. 1) that pushes against the convex broadface copper 60 on the opposite side of the mold 15. The spring lock 40 has a handle 41 (FIG. 1) for simple operation and the force only has to be enough to hold the gauge 10 securely in position.

Turning to FIG. 3, in the example shown the alignment gauge 10 is used to align the concave broadface copper 14 in the mold 15 with the first and second roll 50, 51 in the zero segment 54 to continue the main radius of the caster throughout. The alignment gauge 10 is designed to position the two sets of digital probes 21 to detect the position of the first and second rolls 50, 51 in the zero segment 54. As stated above, the invention is not limited to aligning the probes 21 with the first and second rolls in the zero segment as other reference points below the mold may also be suitable. The preset zero point on the probes 21 indicates, to the operator of the gauge 10, the relationship between the position of the mold 15 and the zero segment roll positions. The mold 15 is then moved to align the radius of the broadface concave copper 14 with the rolls 50, 51 to continue this radius uninterrupted across the contact points of the rolls in the zero segment 54.

In operation, the gauge block 30 is used to set the digital readout for the remote probes 21 to the zero position. The alignment gauge 10 is then inserted down into the mold cavity 29 until the support members 22 rest on the concave and convex broadface water boxes 26, 27 (the machined surface on the top of each water box directly behind the broadface copper). With the alignment gauge 10 resting on the water boxes, the spring lock or side clamps 40 are used to lock the convex edge 17 of the gauge 10 against the concave surface 14 of the broadface copper. Once the gauge 10 is locked in place, an inspection is made to confirm that no gap is showing between the two surfaces. At this point, the gauge 10 is correctly positioned in the mold cavity 29 and the readings can be used to adjust the position of the mold 15 relative to the zero segment 54 so that the proper alignment can be achieved.

In FIG. 3, the broadface foot roll 70 is also shown. It will be evident to those of ordinary skill in the art that the relationship between the machined surface at the top of the water box and the curvature of the concave broadface copper will vary depending on the particular continuous casting mold. Accordingly, the dimensions of the gauge 10 of the present invention will vary depending on the geometry of the mold 15.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. An alignment gauge for aligning a continuous casting mold with a reference point disposed below the mold, the mold having a broadface copper with a concave curved wall and having a machined surface on top of each water box, the gauge comprising:
    at least one frame member having a first side and a second side, the first side having a curved edge conforming to the curved wall of the broadface copper, the first side also having at least one probe extending therefrom;
    at least one support member capable of supporting the gauge from the mold;
    a lock extending from the second side of the at least one frame member, the lock capable of biasing the first side against the broadface copper; and,
    a display for providing information from the at least one probe regarding alignment of the mold relative to the reference point.

2. The alignment gauge of claim 1, wherein the reference point comprises one of the first and second rolls in the zero segment.

3. The alignment gauge of claim 1, wherein the reference point comprises the first and second rolls in the zero segment.

4. The alignment gauge of claim 1, further comprising a handle attached to the at least one frame member.

5. The alignment gauge of claim 4, wherein the handle is offset from the center of gravity of the gauge such that the at least one probe rotates in a direction opposite to the first side when the gauge is lifted by the handle.

6. The alignment gauge of claim 1, further comprising a gauge block having a curved edge matching the curved edge on the first side of the at least one frame member.

7. The alignment gauge of claim 6, wherein the gauge block has a locating feature for placing the gauge block in registry with the at least one frame member.

8. The alignment gauge of claim 7, wherein the locating feature is a serpentine curve.

9. The alignment gauge of claim 1, wherein the support member comprises a pair of arms extending in opposite directions from the at least one frame member.

10. The alignment gauge of claim 1, wherein the lock is a spring-biased lock operated by a handle.

11. The alignment gauge of claim 1, wherein the lock engages with a wall of the mold disposed opposite from the first side of the at least one frame member when the at least one frame member is inserted into a mold cavity.

12. An alignment guide for aligning a continuous casting mold with a reference point below the mold, the mold having a broadface copper with a concave curved wall and having a machined surface on top of each water box, the alignment guide comprising:
    a pair of frame members disposed in spaced apart relation and having a first side and a second side, the first side having a curved edge conforming to the curved wall of the broadface copper, the curved edge extending along a portion of the first side, the first side of each of the frame members having at least one probe extending therefrom;
    at least one cross member extending between the pair of frame members;
    at least one support member capable of supporting the gauge from the mold;
    a lock extending from the second side of each of the frame members, the lock capable of biasing the first side of each of the frame members against the broadface copper; and,
    a display for providing information from each of the probes regarding alignment of the mold relative to the reference point.

13. The alignment gauge of claim 12, wherein the reference point is one of the first and second rolls in the zero segment.

14. The alignment gauge of claim 12, wherein the reference point is the first and second rolls in the zero segment.

15. The alignment gauge of claim 12, further comprising a handle attached to the gauge.

16. The alignment gauge of claim 15, wherein the handle is offset from the center of gravity of the gauge such that the at least one probe rotates in a direction opposite to the first side when the gauge is lifted by the handle.

17. The alignment gauge of claim 12, further comprising a gauge block having an curved edge matching the curved edge on the first side of each of the frame members.

18. The alignment gauge of claim 17, wherein the gauge block has a locating feature for placing the gauge block in registry with each of the frame members.

19. The alignment gauge of claim 18, wherein the locating feature is a serpentine curve.

20. The alignment gauge of claim 12, wherein the support member comprises a pair of arms extending in opposite directions from each of the frame members.

21. The alignment gauge of claim 12, wherein the lock is a spring-biased lock operated by a handle.

22. The alignment gauge of claim 12, wherein the lock engages with a wall of the mold disposed opposite from the first side of the frame members when the frame members are inserted into a mold.

23. A method for aligning a continuous casting mold with a reference point below the mold, the continuous casting mold having a broadface copper with a concave curved wall defining a mold cavity, the continuous casting mold having a machined surface on top of each water box, the method comprising:
    providing at least one frame member having a first side and a second side, the first side having a curved edge conforming to the curved wall of the broadface copper, the first side also having at least one probe extending therefrom, at least one support member capable of supporting the guide from the mold, a lock extending from the second side of the at least one frame member, the lock capable of biasing the first side against the broadface copper, and, a display for providing information from the at least one probe regarding alignment of the mold relative to the reference point;

calibrating the at least one probe;
inserting the gauge into the mold cavity until the support member rests on the machined surface of the water box;
locking the convex edge of the gauge against the concave curved wall of the broadface copper; and,
adjusting the position of the mold to align the concave curved wall of the broadface copper relative to the reference point.

* * * * *